United States Patent [19]

Okonogi et al.

[11] Patent Number: 4,957,764
[45] Date of Patent: Sep. 18, 1990

[54] METHOD OF MANUFACTURING JELLY PRODUCTS HAVING FIBROUS TEXTURE

[75] Inventors: Shigeo Okonogi; Hiroya Yuguchi, both of Tokyo; Sumio Tanai, Yokohama; Keiji Morimoto, Matsudo, all of Japan

[73] Assignee: Morinaga Milk Industry Co., Ltd., Tokyo, Japan

[21] Appl. No.: 292,341

[22] Filed: Dec. 30, 1988

[30] Foreign Application Priority Data

Mar. 11, 1988 [JP]  Japan .................................. 63-56130

[51] Int. Cl.$^5$ ............................................... A23L 1/05
[52] U.S. Cl. ..................................... 426/573; 426/615; 426/656
[58] Field of Search ......................... 426/573, 656, 615

[56] References Cited

U.S. PATENT DOCUMENTS 4,200,661  4/1980  Brigand et al. ..................... 426/573
4,717,571  1/1988  Okonogi et al. ..................... 426/573

Primary Examiner—Donald E. Czaja
Assistant Examiner—Helen Pratt
Attorney, Agent, or Firm—Oblon, Spivak, McClelland, Maier & Neustadt

[57] ABSTRACT

A method of manufacturing jelly products having fibrous texture resembling fruit pulp, wherein at least a first liquid material adjusted to pH 4.0 or less and containing at least a kind of proteinous material selected from the group consisting of those originating from eggs, milk and soya beans, and a second liquid material containing at least a kind of gum selected from the group consisting of xanthan gum, gum arabic and pullulane and at least a kind of gelling agent selected from the group consisting of agar, furcellaran, and carrageenan are separately prepared, then they are mixed at a temperature higher than the gelling temperature of the gelling agents used, and cooled for gelling. An additional liquid material including material derived from fruit and/or vegetable, for example fruit or vegetable juice, can be added to the mixture of said first and second liquid materials in such a manner that said first and second liquid materials are mixed and after fibrous textures are actually formed in the resultant mixture, the additional liquid materials are added to the mixture while it maintains its flowability.

3 Claims, No Drawings

METHOD OF MANUFACTURING JELLY PRODUCTS HAVING FIBROUS TEXTURE

BACKGROUND OF THE INVENTION

1. Field of the Invention

The present invention relates to a method of manufacturing jelly products having fruit-like fibrous texture wherein a plurality of liquid materials are separately prepared, the resulting liquid materials are mixed at a temperature higher than the gelling temperature determined by the gelling agents used in said liquid materials, then the resulting mixture is cooled for gelling.

2. Discussion of the Background

Heretofore many attempts have been made to give fresh fruit-like texture to jelly products. In accordance with one of the most typical methods, fruit pulps are actually mixed into a liquid material for preparing jelly products. In this method, however, it is required to use a considerably large proportion of pulps in the ingredients for the products to obtain the desired texture and to minimize shearing force applied to the liquid material in the manufacturing process to reduce destruction of the fibrous texture of the pulps. These requirements, however, contradict each other, since increase of the pulp content results in increase of viscosity of the liquid material which in turn results in increase of shearing force to be applied to the pulps in the liquid material and increases destruction of fibrous texture of the pulps during the process. Thus this method is not applicable to the cases wherein fruits having soft texture such as melons, peaches and bananas are used.

There are known methods wherein jelly products are made to imitate fruit-like texture without using textures originating from fruit pulps. One typical method is a freezing/thawing method (cf: Japanese Unexamined Patent Application Gazette Nos. 57 (1982)-189653 and 57(1982)-36950). More particularly, jelly is frozen to form ice crystals in a gel texture, and after permitting the ice crystals grow to a desired extent for partial destruction of the gel texture, the frozen jelly is thawed to form partially destroyed and partially undestroyed texture to thereby form fibrous texture as a whole. This method, however, suffers from the defects that a large scale installation for freezing and thawing is required when the method is carried out on an industrial scale and becomes difficult to manufacture fibrous jelly products having uniform quality due to non-uniform growth of ice crystals caused by slight or subtle variations of freezing conditions such as temperature, speed, and time for freezing.

Another typical method is that fibrous texture is formed using some combination of gelling agents (cf: Japanese Unexamined Patent Application Gazette Nos. 59(1984)-159745 and 59(1984)-159746). More particularly, fibrous texture is formed by mixing a first liquid material containing gelatin and a second liquid material containing at least a gelling agent selected from the group consisting of carrageenan, furcellaran, low methoxyl pectin and agar-agar under acidic condition for reaction therebetween. The defects of these methods are that the formation of fibrous texture and furthermore solidification of the mixture of said first and second liquid materials cannot be assured depending upon slight or subtle variation of the reaction conditions such as temperature and agitation during the reaction process, since the optimum temperature range in which the fibrous textures are formed in the mixture of the first and second liquid materials is very close to the gelling temperature of the mixture.

In order to solve the problems encountered in the conventional methods, the inventors of the present invention have developed a new and simple method which is well suited for industrially manufacturing jelly products having fibrous texture in uniform quality.

SUMMARY OF THE INVENTION

It is an object of the invention to provide a simple method for industrially manufacturing jelly products having fibrous texture and of uniform quality.

In accordance with the present invention, at least two kinds of liquid materials are separately prepared.

A first liquid material contains at least one proteinaceous material selected from the group consisting of those originating from eggs, milk and soya beans and adjusted to a pH of 4.0 or less.

A second liquid material contains at least one substance selected from the group consisting of xanthan gum, gum arabic and pullulane and at least one gelling agent selected from agar-agar, furcellaran and carrageenan and having a pH value which causes the pH value of the mixture of said two liquid materials to become equal to or less than 5.0.

The first and second liquid materials are mixed to form fibrous textures.

Any other conventional ingredients for jelly products such as acids, sweeteners, other seasonings, flavors, coloring agents, small quantity of materials derived from fruit and/or vegetable, for example, juice, pulp, puree of fruit and/or vegetable and the like can be included in said first and/or second liquid materials. They can be added to the mixture of said firs and second liquid materials in the form of an additional liquid material in which one or more of them are included. In the case when a large quantity of materials derived from fruit and/or vegetable is used, it is preferable to prepare an additional liquid material in which one or more of them is included instead of adding it to the mixture of said first and second liquid materials after the fibrous texture is formed therein, since substances, such as pectin, contained in fruit and/or vegetable may disturb the formation of fibrous texture.

When mixing of liquid materials at least one of which includes one or more gelling agents, they are mixed together at a temperature higher than the gelling temperature determined by the gelling agents used in said liquid materials. After all the liquid materials are mixed, the resultant mixture is cooled for gelling.

DESCRIPTION OF THE PREFERRED EMBODIMENTS

One or more of the proteinaceous materials to be used in the present invention are selected from those derived from eggs, milk and soya beans. One or more of the gelling agents to be used in the present invention are selected from the group consisting of carrageenan, furcellaran and agar-agar. One or more of the gum substances to be used in the present invention are selected from the group consisting of xanthan gum, gum arabic and pullulane. These materials are available in the market.

The first liquid material can be prepared by dispersing one or more of the proteinaceous materials in water and adjusting its pH equal to or less than 4.0 by adding acid thereto. The quantity of the proteinaceous material to be included in the first liquid material should be to give a protein content equal to or more than 0.02 wt. % in the mixture of the first and second liquid materials. Preferably, the resultant liquid is heated to a temperature of more than 65° C. for pasteurization.

The second liquid material can be prepared by dispersing one or more of the gum substances and one or more of the gelling agents into water. A quantity of the gum substance should be included in a second liquid material to give a percentage equal to or more than 0.02 wt. % of the gum substance in the mixture of said first and second liquid materials. A quantity of the gelling agent should be included in a second liquid material to give a percentage 0.1-1.0 wt. % of the final product.

Any other conventional ingredients for jelly products such as acids, sweeteners, other seasonings, flavors, coloring agents, small quantity of materials derived from fruits and/or vegetables, for example, juices, pulps, puree of fruit and/or vegetable and the like can be included in said first and/or second liquid materials. They can be added to the mixture of said first and second liquid materials as an additional liquid material in which one or more of them are included. In the case when a large quantity of materials derived from fruits and/or vegetables is added, it is preferable to prepare an additional liquid material in which one or more of them are included rather then adding it to the mixture of said first and second liquid materials after fibrous textures are formed therein, since substances, such as pectin, contained in fruits and/or vegetables may disturb the formation of fibrous bodies. It should be noted that, when one or more materials derived from fruits and/or vegetables are added to the first and second liquid material, there is an upper limit to the quantity that can be added. However, when they are added to the mixture of said first and second liquid materials, there is no limitation of the quantity to be added.

All the liquid materials other than the first liquid material are so adjusted as to cause the pH value of the resultant mixture of liquid materials to become equal to or less than 5.0. The selection of the gelling agents and the gu substances to be used are determined taking the mouthfeel, taste and texture of the final products into consideration.

When mixing of the liquid materials at least one of which includes a gelling agent, they are mixed together at a temperature higher than the gelling temperature of the gelling agents used in the second liquid materials.

All of these liquid materials can be subjected to sterilization or pasteurization by heating.

Thus prepared liquid materials are mixed and caused to form fibrous textures therein, then cooled to a temperature equal to or lower than 10° C. for gelling to prepare jelly products having fibrous texture. More particularly, mixing of said first and second liquid materials may produce fibrous textures in the resultant mixture, and one or more gelling agents included in second liquid material may solidify the mixture.

Only an essential condition for the mixing of the second liquid material which includes the gelling agent is to adjust the temperatures of the respective liquid materials higher than the gelling temperature of the mixture.

Mixing of said first and second liquid materials is preferably made under agitating condition which results in laminer flow and eliminates or minimizes turbulent flow. When batchwise mixing is used, for example, a 1000 l capacity tank with an anchor type agitator can adequately be used at 18-72 r.p.m. which generates laminar flow. When line mixing is carried out in pipe lines, for example, it is preferable to control the flow velocities of liquid materials in the pipe lines so as to eliminate turbulence substantially after they flow together. A desirable agitating condition can be determined by taking the Reynolds number into consideration.

It will be understood from the foregoing that in order to simplify the method, it is preferable to use only two liquid materials, one containing proteinaceous materials and the other containing gum substances and gelling agents.

When a material derived from fruits and vegetables is to be added, it is preferable to add it as an additional liquid material after said first and second liquid materials are mixed and fibrous textures are formed therein.

Any other additional ingredients can be included in any of the liquid materials.

The mixture of the liquid materials can be filled into containers and sealed prior to cooling.

The following is presented for a better understanding of the present invention.

TEST 1

The purpose of this test is to exemplify the effects of variations in the pH value of the first liquid materials on the formation of fibrous texture.

(1) PREPARATION OF TEST SAMPLES

(1-1) Preparation of First Liquid Material

Seven samples of 2.0 wt. % aqueous solution of skim milk having different pH values as shown in Table 2 were prepared by adding thereto different quantities of 10 wt. % aqueous solution of citric acid. Respective samples were heated to 80° C. for 10 minutes, then cooled to 30° C.

(1-2) Preparation of Second Liquid Material

A quantity of a sample of the second liquid material having the composition as shown in Table 1 was prepared by dispersing the ingredients in water, heating the resultant mixture to 100° C. for 10 minutes, and then cooling to 70° C.

TABLE 1

| | |
|---|---|
| xanthan gum | 0.10 wt. % |
| sodium citrate | 0.20 wt. % |
| agar-agar | 0.40 wt. % |
| water | 99.30 wt. % |
| Total | 100.00 wt. % |

(2) PREPARATION OF JELLY PRODUCTS

Having mixed 22 g of the respective samples of the first liquid materials into seven lots of the second liquid material each weighing 78 g, seven samples of liquid mixtures were prepared. The temperatures of the respective liquid mixtures were about 65° C. The resultant mixtures were respectively cooled to 10° C. for gelling. The resultant jelly products were observed with the naked eye for evaluation of their texture.

(3) THE RESULTS OF THE TEST

The results of the test are shown in Table 2.

TABLE 2

| pH of 1st liquid material | pH of liquid mixture | evaluation of jelly texture |
|---|---|---|
| 2.5 | 4.2 | ◎ |
| 3.0 | 4.5 | ◎ |
| 3.5 | 4.7 | ◎ |
| 4.0 | 5.0 | ○ |
| 4.5 | 5.2 | x |
| 5.0 | 5.4 | x |
| 5.5 | 5.6 | x |

Note:
◎: fibrous textures of 5-10 mm long being uniformly suspended
○: fibrous textures of 1-5 mm long being uniformly suspended
x: observed no fibrous textures (4) CONCLUSION From the results shown in Table 2, it is apparent that a fibrous texture is formed only when the first liquid materials are adjusted to a pH 4.0 or less.

(5) SUPPLEMENTAL TEST AND THE RESULTS THEREOF

The purpose of this supplemental test is to exemplify the effects of variations in pH value of the first liquid material in relation to the variations in pH value of the second liquid material with regard to the formation of fibrous textures.

Various samples of the second liquid materials having different pH values were prepared by adjusting pH of the second liquid material prepared in Test 1 by the addition of an aqueous solution of sodium hydroxide or citric acid. Using the resultant various samples of the second liquid material and the seven samples of the first liquid material prepared in Test 1, jelly products were prepared in the same manner as in Test 1. The results were the same as shown in Table 2. In other words, fibrous textures were formed when the first liquid materials were adjusted to pH 4.0 or less, and the pH values of the mixtures of said first and second liquid materials were equal to or less than 5.0.

TEST 2

The purpose of this test is to exemplify the effects of the variations in pH value of the mixture of said first and second liquid materials to the formation of fibrous textures.

(1) PREPARATION OF TEST MATERIALS (1-1) Preparation of First Liquid Material

A quantity of a sample of 2.0 wt. % of aqueous skim milk solution was prepared by dissolving skim milk in water in the same manner as in Test 1. The resultant solution was adjusted to pH 3.5 by adding 10 wt. % aqueous solution of citric acid. The resultant solution was heated to 80° C. for 10 minutes, then cooled to 30° C.

(1-2) Preparation of Second Liquid Material

Seven samples of the second liquid material having different pH values as shown in Table 3 were prepared in the same manner as in Test 1. Each of the samples were heated to 100° C. for 10 minutes, then cooled to 70° C.

(2) PREPARATION OF JELLY PRODUCTS

Using the respective samples, jelly products were prepared in the same manner as in Test 1.

(3) RESULTS

The results are shown in Table 3.

TABLE 3

| sample No. | ingredient of second liquid material | | | | | pH of the mixture | evaluation of jelly texture |
|---|---|---|---|---|---|---|---|
| | xanthan gum | sodium citrate | agar | water | total | | |
| 1 | 0.10 | 0.10 | 0.40 | 99.40 | 100.00 | 3.7 | ◎ |
| 2 | 0.10 | 0.15 | 0.40 | 99.35 | 100.00 | 4.1 | ◎ |
| 3 | 0.10 | 0.20 | 0.40 | 99.30 | 100.00 | 4.5 | ◎ |
| 4 | 0.10 | 0.25 | 0.40 | 99.25 | 100.00 | 5.0 | ○ |
| 5 | 0.10 | 0.30 | 0.40 | 99.20 | 100.00 | 5.5 | x |
| 6 | 0.10 | 0.40 | 0.40 | 99.10 | 100.00 | 5.8 | x |
| 7 | 0.10 | 0.60 | 0.40 | 98.90 | 100.00 | 6.0 | x |

Note:
◎: fibrous textures of 5-10 mm long being uniformly suspended
○: fibrous textures of 1-5 mm long being uniformly suspended
x: observed no fibrous textures (4) CONCLUSION It is apparent that the fibrous textures were formed only when the liquid mixtures were adjusted to pH 5.0 or less.

TEST 3

The purpose of this test is to exemplify the effects of the kinds of proteinaceous material to be contained in a first liquid material in the formation of the fibrous textures.

(1) PREPARATION OF TEST MATERIALS (1-1) Preparation of First Liquid Material

Seven samples of the first liquid material each containing one of the proteinaceous materials as shown in Table 4 were prepared in the same manner as in Test 2.

(1-2) Preparation of Second Liquid Material

A quantity of a sample of the second liquid material was prepared in the same manner as in Test 1.

(2) PREPARATION OF JELLY PRODUCTS

Using the samples prepared, a plurality of jelly products were prepared in the same manner as in Test 1.

(3) RESULTS OF THE TEST

The results are shown in Table 4.

TABLE 4

| sample No. | ingredients of the first liquid material | | | | evaluation of jelly textures |
|---|---|---|---|---|---|
| | proteinous material | citric acid | water | total | |
| 8 | skim milk 1.8% | 0.6% | 97.6% | 100.00% | ◎ |
| 9 | whey powder 4.2% | 0.6% | 95.2% | 100.00% | ◎ |

TABLE 4-continued

| sample No. | ingredients of the first liquid material | | | | evaluation of jelly textures |
|---|---|---|---|---|---|
| | proteinous material | citric acid | water | total | |
| 10 | gelatin 0.6% | 0.6% | 98.8% | 100.00% | x |
| 11 | egg white 5.7% | 0.6% | 95.5% | 100.00% | ○ |
| 12 | egg yolk 3.9% | 0.6% | 95.5% | 100.00% | ◉ |
| 13 | soybean flower 1.8% | 0.6% | 97.6% | 100.00% | ○ |
| 14 | wheat flower 5.7% | 0.6% | 93.7% | 100.00% | x |

Note:
◉ : fibrous textures of 5-10 mm long being uniformly suspended
○ : fibrous textures of 1-5 mm long being uniformly suspended
x: observed no fibrous textures

(4) CONCLUSION

It is apparent that fibrous textures were formed only when proteinaceous materials originating from milk (skim milk powder, whey), eggs (egg white, egg yolk) and soya beans (soya bean flour) were used.

TEST 4

The purpose of this test is to exemplify the effects of variations in the concentration of protein included in the first liquid material o the formation of fibrous texture.

(1) PREPARATION OF TEST MATERIALS

(1-1) Preparation of First Liquid Material

Eight samples of the first liquid material having different concentrations of protein as shown in FIG. 5 were prepared. Each of the resultant liquid was adjusted to pH 3.5 by adding 10% aqueous solution of citric acid. The resultant solutions were heated to 80° C. for 10 minutes, then cooled to 30° C.

(1-2) Preparation of Second Liquid Material

A quantity of a sample of the second liquid material was prepared in the same manner as in Test 1.

(2) PREPARATION OF JELLY PRODUCTS

Using the prepared samples, a plurality of jelly products were prepared in the same manner as in Test 1.

(3) RESULTS

The results are shown in Table 5.

TABLE 5

| concentration of skim milk in 1st liquid materials (wt. %) | concentration of protein in the mixtures of 1st and 2nd liquid (wt. %) | evaluation of jelly texture |
|---|---|---|
| 0.2 | 0.015 | x |
| 0.3 | 0.022 | ○ |
| 0.5 | 0.037 | ◉ |
| 1.0 | 0.075 | ◉ |
| 1.5 | 0.112 | ◉ |
| 2.0 | 0.150 | ◉ |
| 3.0 | 0.224 | ◉ |
| 4.0 | 3.0 | ◉ |

Note:
◉ : fibrous textures of 5-10 mm long being uniformly suspended
○ : fibrous textures of 1-5 mm long being uniformly suspended
x: observed no fibrous textures

(4) CONCLUSION

From the results shown in Table 5, it is apparent that fibrous textures were formed only when the first liquid materials contained proteinaceous material in an amount which causes the protein content in the mixture of the first and second liquid materials to become 0.02 wt. % or more.

Having used egg white, egg yolk, soya bean flour as proteinaceous materials, the effects of variations in concentration of protein included in the first liquid material to the formation of fibrous textures were tested in the same manner as in Test 4. The results were the same as when skim milk powder was used. In other words, fibrous textures were formed when the first liquid materials contained proteinaceous material in an amount which causes the protein content in the mixture of the first and second liquid materials to become 0.02 wt. % or more.

TEST 5

The purpose of this test is to exemplify the effects of kinds of gum substances to be included in the second liquid material on the formation of fibrous texture.

(1) PREPARATION OF TEST MATERIALS

(1-1) Preparation of First Liquid Material

A quantity of a sample of the first liquid material was prepared in the same manner as Sample No. 8 in Test 3.

(1-2) Preparation of Second Liquid Material

Five samples of the second liquid material each containing one of the gum substances as shown in Table 6 were prepared in the same manner as in Test 1.

(2) PREPARATION OF JELLY PRODUCTS

Using the prepared samples, a plurality of jelly products were prepared in the same manner as in Test 1.

(3) RESULTS OF THE TEST

The results of this test are shown in Table 6.

TABLE 6

| sample No. | ingredients of second liquid materials (%) | | | | | evaluation jelly texture |
|---|---|---|---|---|---|---|
| | gum substances | sodium citrate | agar | water | total | |
| 15 | xanthan gum 0.1 | 0.2 | 0.4 | 99.3 | 100 | ◉ |
| 16 | guar gum 0.1 | 0.2 | 0.4 | 99.3 | 100 | x |
| 17 | locust bean gum 0.1 | 0.2 | 0.4 | 99.3 | 100 | x |
| 18 | gum arabic 0.1 | 0.2 | 0.4 | 99.3 | 100 | ○ |
| 19 | pullulane 0.1 | 0.2 | 0.4 | 99.3 | 100 | ○ |

Note:
◉ : fibrous textures of 5-10 mm long being uniformly suspended
○ : fibrous textures of 1-5 mm long being uniformly suspended
x: observed no fibrous textures

What is claimed is:

1. A method of manufacturing jelly products having fibrous texture, wherein a plurality of liquid materials are separately prepared, then mixed and cooled for gelling to provide the fibrous texture for the jelly products, comprising:
separately preparing (a) first liquid material, the pH of which is adjusted to 4.0 or less with edible acidic means, comprising at least one proteinaceous material selected from the group consisting of those originating from eggs, milk and soya beans in a quantity resulting in the protein content in the final products to be equal to or more than 0.02 wt. %, and (b) a second liquid material, the pH of which results in the pH value of said first and second liquid materials when mixed to be equal to or less than 5.0, comprising at least one gum substance selected from the group consisting of xanthan gum, gum arabic and pullulane in a quantity resulting in the gum content in the mixture of said first and second liquid materials to be equal to or more than 0.02 wt. % and at least one gelling agent selected from the group consisting of agar-agar, furcellarane and carrageenan in a quantity resulting in the gelling agent content in the mixture of all the liquid materials to fall between 0.1-1.0 wt. %.

mixing said first and second liquid materials under moderate agitating condition so as to substantially eliminate turbulent flow at a temperature higher than the gelling temperature of the resultant mixture, determined by the gelling agent used, to form fibrous texture in the mixture; and cooling the mixture to form a gel having fibrous texture.

2. A method of manufacturing jelly products having fibrous texture, wherein a plurality of liquid materials are separately prepared, then mixed and cooled for gelling to provide the fibrous texture for the jelly products, comprising:

separately preparing (a) a first liquid material, the pH of which is adjusted to 4.0 or less with edible acidic means, comprising at least one proteinaceous material selected from the group consisting of those originating from eggs, milk and soya beans, (b) a second liquid material, the pH of which results in the pH value of said first and second liquid materials when mixed to be equal to or less than 5.0, comprising at least one gum substance selected from the group consisting of xanthan gum, gum arabic and pullulane in a quantity resulting in the gum content in the mixture of said first and second liquid materials to be equal to or more than 0.02 wt. % and at least one gelling agent selected from the group consisting of agar-agar, furcellarane and carrageenan in a quantity resulting in the gelling agent content in the mixture of all the liquid materials to fall between 0.1-1.0 wt. %; and (c) an additional liquid material comprising a separately prepared material derived from fruit or vegetables or mixtures thereof;

mixing said first and second liquid materials to form fibrous texture in the mixture;

mixing said additional liquid material with the mixture of said first and second materials at a temperature higher than the gelling temperature of the resultant mixture, determined by the gelling agent used, and cooling the mixture to form a gel having fibrous texture.

3. The method of claim 2, wherein said material derived from fruit or vegetable or mixtures thereof is selected from the group consisting of juice, pulps and puree of fruit and vegetable and mixtures thereof.

* * * * *